(12) United States Patent
Okamura

(10) Patent No.: US 9,291,211 B2
(45) Date of Patent: Mar. 22, 2016

(54) WET FRICTION MATERIAL

(71) Applicant: Hiroki Okamura, Toyota (JP)

(72) Inventor: Hiroki Okamura, Toyota (JP)

(73) Assignee: AISIN KAKO KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 14/280,830

(22) Filed: May 19, 2014

(65) Prior Publication Data

US 2014/0346003 A1 Nov. 27, 2014

(30) Foreign Application Priority Data

May 21, 2013 (JP) .................................. 2013-107016
Oct. 11, 2013 (JP) .................................. 2013-213867

(51) Int. Cl.
| | | |
|---|---|---|
| *F16D 13/64* | (2006.01) | |
| *F16D 13/74* | (2006.01) | |
| *F16D 25/12* | (2006.01) | |
| *F16D 69/00* | (2006.01) | |

(52) U.S. Cl.
CPC .............. *F16D 13/64* (2013.01); *F16D 13/648* (2013.01); *F16D 13/74* (2013.01); *F16D 25/123* (2013.01); *F16D 2069/004* (2013.01)

(58) Field of Classification Search
None
See application file for complete search history.

(56) References Cited

U.S. PATENT DOCUMENTS

| | | | | |
|---|---|---|---|---|
| 4,674,616 | A * | 6/1987 | Mannino, Jr. ............ | 192/113.36 |
| 5,782,327 | A * | 7/1998 | Otto et al. ................ | 192/113.36 |
| 6,712,190 | B2 * | 3/2004 | Kitaori .................. | F16D 13/648 |
| | | | | 188/264 B |
| 2007/0102258 | A1 * | 5/2007 | Miyazaki et al. ........ | 192/113.36 |

FOREIGN PATENT DOCUMENTS

| | | |
|---|---|---|
| JP | 11-141570 | 5/1999 |
| JP | 2001-295859 A | 10/2001 |
| JP | 2005-282648 A | 10/2005 |
| JP | 2010-101402 A | 5/2010 |

OTHER PUBLICATIONS

Machine translation of JP 2010-101402A, Asai, K., May 6, 2010.*

* cited by examiner

*Primary Examiner* — Richard Lorence
(74) *Attorney, Agent, or Firm* — Sughrue Mion, PLLC; Richard C. Turner

(57) ABSTRACT

In a wet friction material, a plurality of segment pieces is disposed at both sides of inter-segment grooves. The segment pieces are composed of first segment pieces and second segment pieces. The first segment piece has at least two inner peripheral recesses formed on an inner periphery thereof and at least two outer peripheral recesses formed on an outer periphery thereof. The outer periphery of the first segment piece has a short dimension. The second segment piece has at least two inner peripheral recesses formed on an inner periphery thereof and at least two outer peripheral recesses formed on an outer periphery thereof. The outer periphery of the second segment piece has a long dimension.

11 Claims, 10 Drawing Sheets

F I G. 1
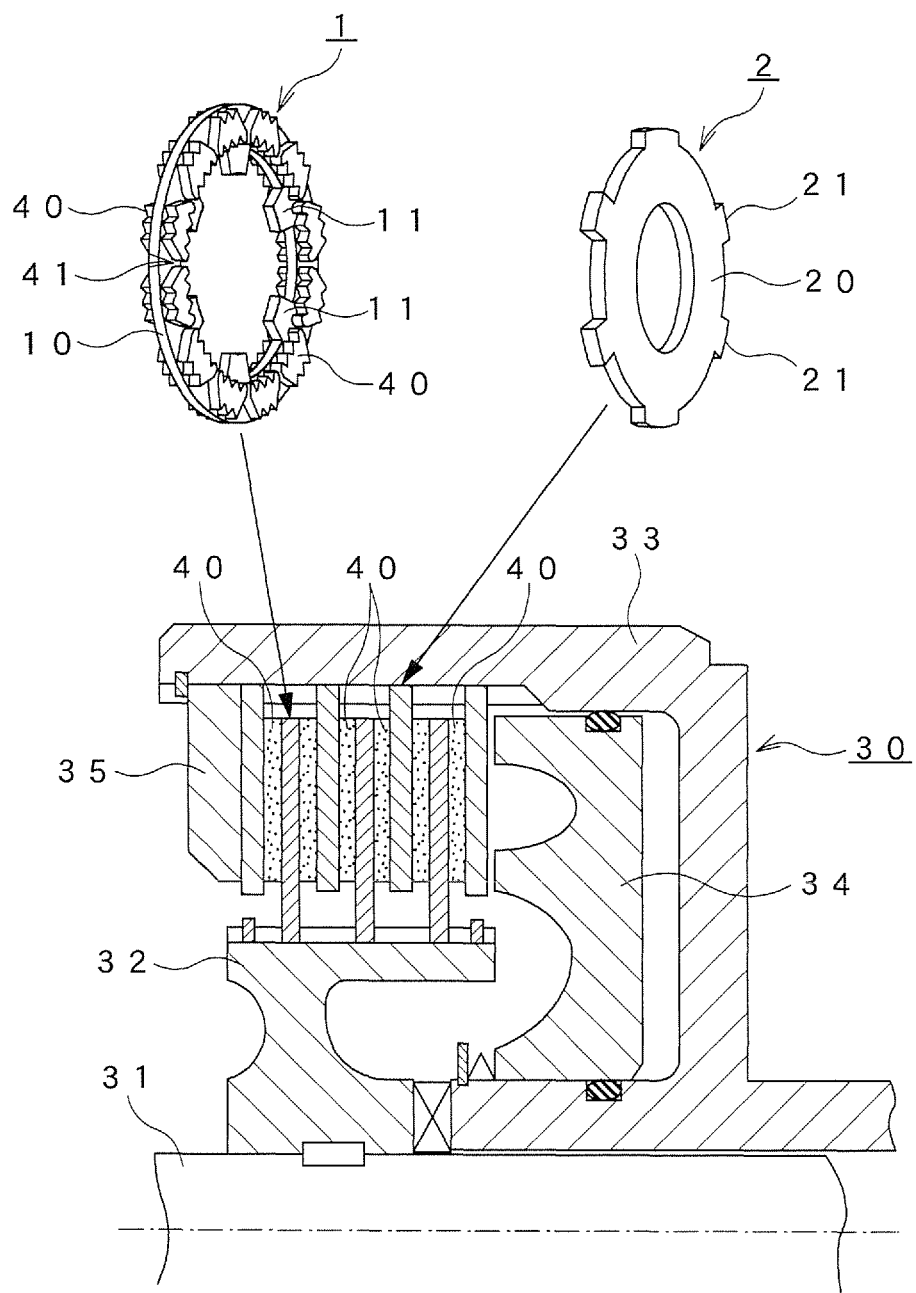

F I G. 3a
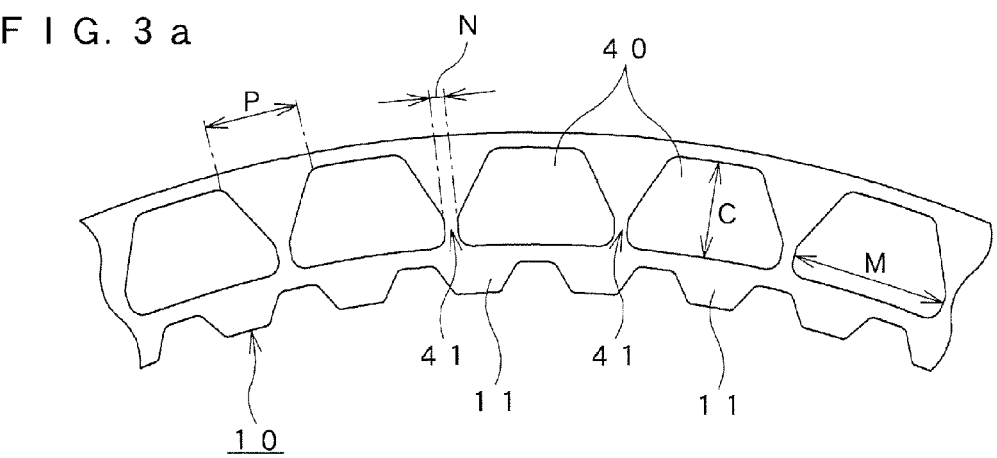
F I G. 3b
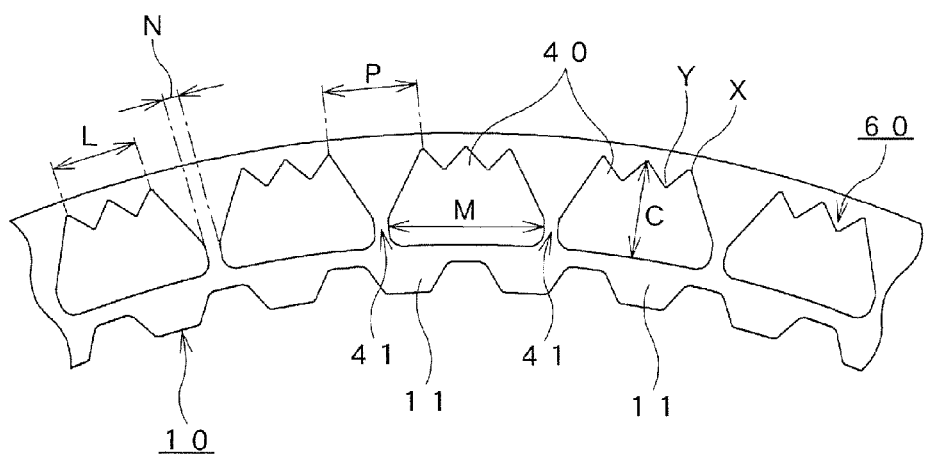

F I G. 9
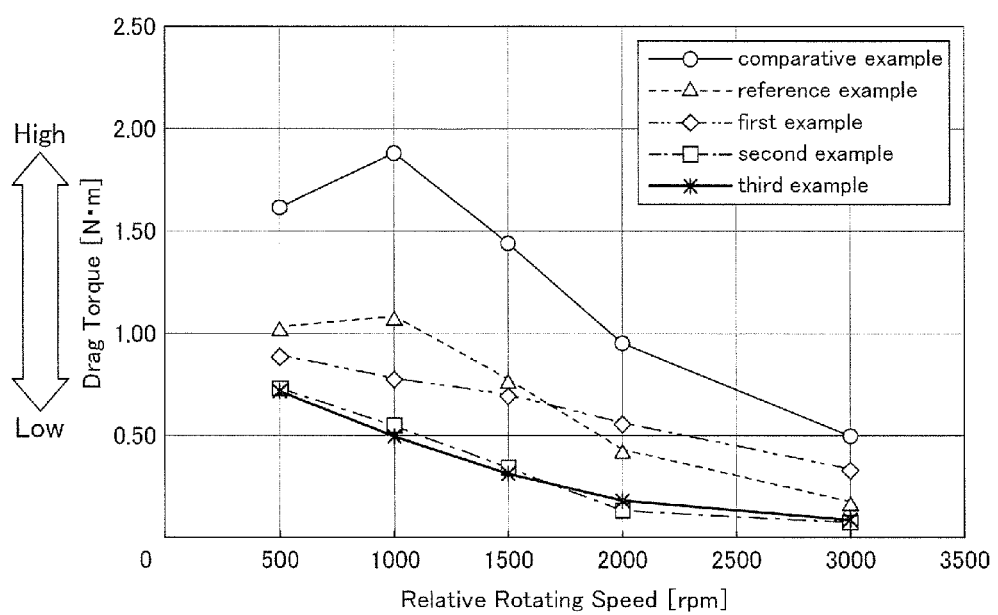

WET FRICTION MATERIAL

BACKGROUND OF THE INVENTION

1. Field of the Invention

This invention relates to a wet friction material that constitutes a single friction plate or plural friction plates for use in a clutch for an automatic transmission, which may be hereafter referred to as "AT", of a vehicle, an automatic transmission of automobiles or motorcycles, or the like.

2. Description of the Related Art

In recent years, high fuel efficiency in a vehicle and a low drag torque characteristic are required from the viewpoints of a rise in crude oil price and prevention of global warming.

Generally, oil grooves are formed on a contact surface side of segment pieces with a counter plate and lubricating oil or automatic transmission fluid, which may be hereafter referred to as "ATF", is supplied thereto to lessen a drag torque. "ATF" is a registered trademark of Idemitsu Kosan Co., Ltd. However, the lubricating oil for automatic transmission or the automatic transmission fluid is generically abbreviated here as "ATF", regardless of the registered trademark.

A conventional wet friction material has reduced the drag torque by controlling a flow of ATF flowing through a friction interface and by forming grooves at the friction interface.

As an example, Japanese Patent Laid-Open Publication No. 2001-295859 ("JP2001-295859") discloses a wet friction material comprising a core plate and a plurality of segment pieces stuck at intervals on the core plate in a ring shape. In JP2001-295859, lubricating oil grooves are defined between two adjacent segment pieces or formed respectively by facing lateral end surfaces of the adjacent segment pieces. Thus, the lubricating oil grooves connect an inner peripheral side and an outer peripheral side of the core plate. In JP2001-295859, at least one of the facing lateral end surfaces of the segment piece has a cut-in part at an inner peripheral opening portion and/or a middle part thereof. Thus, the lubricating oil groove includes a large width part of a large groove width that is formed by the cut-in part at the inner peripheral opening portion and/or the middle part thereof.

More specifically, in addition that the lubricating oil groove is sectioned and formed by the facing lateral end surfaces (or opposite end surfaces) of the segment piece, the cut-in part is provided on the inner peripheral end portion and/or the middle part of the opposite end surfaces of the segment piece. Consequently, the opposite end surface is formed into a non-linear shape, and the groove width of the lubricating oil groove is not constant. Thus, the lubricating oil groove has a non-large width part of a groove width smaller than that of the large width part, in addition to the large width part of the large groove width. As described above, if the lubricating oil grooves have the large width part and the non-large width part by forming the cut-in part dented inward on the segment piece, ATF running from the inner peripheral side toward the outer peripheral side of the lubricating oil groove is blocked at a point where the width of the lubricating oil groove is changed from the large width part to the non-large width part. Then, a part of ATF overflows and runs over top surfaces of the segment pieces.

Japanese Patent Laid-Open Publication No. 2005-282648 ("JP2005-282648") discloses a wet friction material comprising a plurality of lubricating oil grooves. The lubricating oil groove is formed by a clearance between adjacent ones of segment pieces. Alternatively, the lubricating oil groove is formed by applying press working on a friction member that is provided on each of opposite surfaces or on one surface of a metal core plate. The plurality of lubricating oil grooves are composed of two kinds of lubricating oil grooves (first lubricating oil grooves and second lubricating oil grooves). In the first lubricating oil groove, an inner peripheral opening portion or a middle part thereof is bulged or enlarged so that the lubricating oil groove is shaped into a symmetrical shape. The second oil groove has an almost uniform width from an inner peripheral opening portion to an outer peripheral opening portion. The first and the second lubricating oil grooves are mixed at a predetermined ratio. When the wet friction material runs idle in a disengaged state in either direction, ATF supplied from an inner periphery comes into contact with a first portion (of the bulged two sides) of the lubricating oil groove that is enlarged toward an idling rear side. Consequently, ATF is actively supplied to a friction surface of a friction material substrate to restrain contact between a counter plate and the friction surface of the friction material substrate. Thus, excess ATF is discharged by the oil groove having the almost uniform width from the inner peripheral opening portion to the outer peripheral opening portion thereof. As a result, it is possible to obtain a remarkable effect to reduce the drag torque. On the other hand, when the wet friction material runs idle in a reverse direction, a second portion (of the bulged two sides) at an opposite side of the oil groove plays the same role as the first portion. If the wet friction material is embodied into a segment-type friction material, the segment pieces can be formed into a large size that extends laterally and that occupies nearly a full width of a ring shape of the metal core plate. Therefore, the number of the segment pieces can be reduced, and the time for cutting out and sticking the segment pieces can be shortened, so that cost reduction can be achieved. Moreover, if the wet friction material is embodied in a press-type friction material, it can be produced only by sticking a friction material substrate on both surfaces or one surface along an entire circumference of the ring shape of the metal core plate and by pressing both surfaces or one surface thereof. Therefore, cost reduction can be achieved by mass production.

In addition, Japanese Patent Laid-Open Publication No. 2010-101402 ("JP2010-101402") discloses a wet friction material as a segment-type friction material or a ring-type friction material. In the segment-type friction material, a plurality of segment pieces is prepared by cutting a friction material substrate into a segment shape. Then, the segment pieces are attached via an adhesive to one side or opposite sides of a flat ring-shaped metal core along an entire circumference of the metal core. At this time, the segment pieces have their outer circumferential edges located inward by a predetermined amount from an outer periphery of the metal core to provide a clearance area of such predetermined amount or width therebetween. One or plural protrusions is/are provided on the outer peripheral side of the segment pieces (i.e. at the clearance portion be) so as to protrude toward the outside. In the ring-type friction material, a ring-shaped piece is prepared by cutting a friction material substrate into a ring shape. Then, the ring-shaped piece is attached via an adhesive to one side or opposite sides of the metal core along an entire circumference of the metal core. At this time, the ring-shaped piece has an outer circumferential edge thereof located inward by a predetermined amount from an outer periphery of the metal core to provide a clearance area of such predetermined amount or width therebetween. One or plural protrusions is/are provided on the outer peripheral side of island shaped portions of the ring-shaped piece so as to protrude toward the outside.

As described above, the protrusion(s) is/are provided to project toward and inside the clearance area. Consequently, if a flow of ATF is accumulated in an outer peripheral portion by a centrifugal force in a region of relatively high rotating speed, such flow is controlled by the protrusion(s). Thus, a flow of ATF is prevented from being disturbed by a high-rotation speed. As a result, ATF is kept from running over the segment pieces or the island shaped portions. Thereby, there is attained a great effect to reduce a drag torque even in the region of relatively high rotating speed. Thus, there is provided a wet friction material that is a segment-type friction material or a ring-type friction material and that obtains an excellent effect to reduce the drag torque even in the region of relatively high rotating speed by controlling excess flow of ATF flowing from the clearance area to the segment pieces or the island shaped portions.

According to JP2001-295859, ATF running from the inner peripheral side toward the outer peripheral side of the oil grooves is blocked at the point where the width of the oil grooves is changed from the large width part to the non-large width part. Then, a part of ATF overflows and runs over the top surface of the wet friction material. Thereby, the drag toque can be reduced.

The wet friction material according to JP2005-282648 has two types of lubricating oil grooves mixed at the predetermined ratio: one having the almost uniform width from the inner peripheral opening portion thereof to the outer peripheral opening portion thereof and the other having non-uniform width. Thus, when the wet friction material runs idle in the disengaged state in either direction, ATF supplied from the inner periphery is actively supplied to the friction surface of the friction material substrate. As a result, the contact between the counter plate and the friction surface is restrained.

However, in the inventions described in JP2001-295859 and JP2005-282648, ATF running along an inner peripheral end face and an outer peripheral end face of the segment piece comes into contact with the inner peripheral end face and the outer peripheral end face of the segment piece. Therefore, it is hard to reduce a drag torque generated by a resulting contact resistance or shearing torque.

In the wet friction material according to the JP2010-101402, the protrusions control the flow of ATF that is accumulated in the outer peripheral portion by the centrifugal force in the region of relatively high rotating speed. Thus, it is prevented that the flow of ATF is disturbed by the high-speed rotation thereby to make ATF run over the segment pieces or the island shaped portions. Thereby, an effect to reduce the drag torque can be obtained even in the region of relatively high rotating speed.

However, the invention of the JP2010-101402 aims to control excess ATF flowing over the segment pieces or the island shaped portions. With respect to a drag torque generated by contact between ATF and an inner peripheral end face and an outer peripheral end face of the segment piece, it is hard to obtain a sufficient effect to reduce the drag torque as in the inventions described in JP2001-295859 and JP2005-282648.

In the conventional techniques, though not limited to JP2001-295859, JP2005-282648 and JP2010-101402, a plurality of segment friction materials is stuck on a core plate in a ring shape at intervals. A counter plate faces the segment friction materials. The segment friction materials aim to reduce a drag toque, while keeping a contact area with the counter plate as a counter member as large as possible, in order to assure a desired torque transmission.

In view of the above, it is an object of the present invention to provide a wet friction material that controls a contact resistance or a shearing torque between inner and outer peripheral end faces of the wet friction material and ATF and that reduces a drag torque efficiently.

BRIEF SUMMARY OF THE INVENTION

According to a first aspect of the invention, there is provided a wet friction material comprising: a plurality of segment pieces bonded in an annular arrangement on a specific one surface or on both surfaces of a core plate, and inter-segment grooves formed between adjacent ones of the segment pieces, wherein each of the segment pieces has at least two inner peripheral recesses formed on an inner periphery thereof, the inner peripheral recess having a recessed amount within a range of $1/10$ to $1/3$ of a radial width of the segment piece.

Here, the plurality of segment pieces is stuck or bonded annularly on the specific one surface or on both the surfaces of the core plate. The inter-segment grooves are formed by and between facing surfaces (i.e. opposite surfaces) of adjacent ones of the segment pieces.

According to a second aspect of the invention, there is provided a wet friction material comprising: a plurality of segment pieces bonded in an annular arrangement on a specific one surface or on both surfaces of an annular core plate, and inter-segment grooves formed between adjacent ones of the plurality of segment pieces. In the wet friction material, the segment pieces include first segment pieces and second segment pieces. The first segment piece has a first width at an outer periphery and a second width at an inner periphery so that the first width is smaller than the second width. The first segment piece has at least two inner peripheral recesses formed at the inner periphery and at least two outer peripheral recesses formed at the outer periphery. The second segment piece has a third width at an outer periphery and a fourth width at an inner periphery so that the third width is greater than the fourth width. The second segment piece has at least two inner peripheral recesses formed at the inner periphery and at least two outer peripheral recesses formed at the outer periphery. The first segment piece and the second segment piece are alternately disposed to define the annular arrangement. Here, "alternately disposed" means that one or more of the first segment pieces and one or more of the second segment pieces are arranged in an alternate manner, regardless of their number.

According to a third aspect of the invention, there is provided a wet friction material as recited in the first aspect of the invention, in which the segment piece has an inner peripheral end portion remaining at the inner periphery of the segment piece by formation of the inner peripheral recess, the inner peripheral end portion having a circumferential width within a range of 0.3 to 2 mm.

Here, the "inner peripheral end portion", which remains at the inner periphery of each of the plurality of the segment pieces by formation of the inner peripheral recess, means a remaining part that is defined by excluding an opening of the inner peripheral recess provided at the inner periphery of each of the plurality of the segment pieces.

According to a fourth aspect of the invention, there is provided a wet friction material as recited in the first aspect of the invention, in which each of the segment pieces has at least two outer peripheral recesses formed on an outer periphery thereof, the outer peripheral recess having a recessed amount within a range of $1/10$ to $1/3$ of a radial width of the segment piece.

In the wet friction material according to the first aspect of the invention, the plurality of segment pieces are bonded annularly on the specific one surface or on both the surfaces of the core plate. The inter-segment grooves are formed between adjacent ones of the segment pieces. The segment piece has the two or more inner peripheral recesses that are formed on the inner periphery thereof. The recessed amount of the inner peripheral recess is made within the range of ⅒ to ⅓ of the radial width of the segment piece. The wet friction material is structured as such because of the following reasons. That is, if the recessed amount of the inner peripheral recess is below ⅒ of the radial width of the segment piece, it becomes difficult to sufficiently reduce the drag torque, though a desired torque transmission can be achieved. On the other hand, the recessed amount of the inner peripheral recess is above ⅓ of the radial width of the segment piece, it is hard to achieve the desired torque transmission, though the drag torque can be sufficiently reduced.

With the above features, the wet friction material reduces a contact resistance and restrains a shearing torque both of which are caused by and generated between the inner peripheral part of the segment piece and ATF flowing along the inner periphery of the segment piece. Thus, the wet friction material can lessen the drag torque. Moreover, ATF flowing into the inner peripheral recess overflows to a top surface of the segment piece to form an oil film. Thus, the wet friction material can reduce the drag torque that is generated between the segment piece and a counter plate. At this time, the recessed amount of the inner peripheral recess is made within the range of ⅒ to ⅓ of the radial width of the segment piece. Therefore, the wet friction material is capable of reducing the drag torque, while enabling a desired torque transmission.

In the wet friction material according to the second aspect of the invention, the segment pieces are disposed annularly, while each segment piece being located at both sides of the inter-segment groove. The segment pieces are composed of the first segment pieces and the second segment pieces. The outer peripheral width of the first segment piece is smaller than the inner peripheral width. Two or more of the inner peripheral recesses are formed on the inner periphery of the segment piece. Two or more of the outer peripheral recesses are formed on the outer periphery of the segment piece. The outer peripheral width of the second segment piece is greater than the inner peripheral width. Two or more of the inner peripheral recesses are formed on the inner periphery of the segment. Two or more of the outer peripheral recesses are formed on the outer periphery of the segment piece. The first segment pieces and the second segment pieces are disposed alternately.

With the above features, the wet friction material reduces a contact resistance and restrains a shearing torque both of which are caused by and generated between the inner peripheral part of the segment piece and ATF flowing along the inner periphery of the segment piece. Thus, the wet friction material can lessen the drag torque. Moreover, ATF flowing into the inner peripheral recess overflows to a top surface of the segment piece to form an oil film. Thus, the wet friction material can reduce the drag torque that is generated between the segment piece and a counter plate. Furthermore, since the second segment pieces are disposed with the larger outer peripheral width, a torque transmission can be further improved as compared with a case where only the first segment pieces are disposed.

In the wet friction material according to the third aspect of the invention, the circumferential width of the inner peripheral end portion, which remains at the inner periphery of the segment piece by formation of the inner peripheral recess, is within the range of 0.3 to 2 mm. In such range, there is no peeling-off at the inner peripheral end portions of the segment pieces, in addition to the effects achieved in the first or the second aspect of the invention.

In the wet friction material according to the fourth aspect of the invention, the recessed amount of the outer peripheral recess is made within the range of ⅒ to ⅓ of the radial width of the segment piece. Thus, in addition to the effects achieved in the first or the second or the third aspect of the invention, the wet friction material enables a desired torque transmission, while achieving more reduction of the drag torque.

BRIEF DESCRIPTION OF THE SEVERAL VIEWS OF THE DRAWINGS

FIG. 1 is an explanatory drawing showing a use state of a wet friction material according to an embodiment of the present invention.

FIG. 2a and FIG. 2b are explanatory drawings each illustrating the wet friction material according to the embodiment of the present invention, wherein FIG. 2a is a front view of the wet friction material, and FIG. 2b is an enlarged view of an essential part thereof.

FIG. 3a and FIG. 3b are explanatory drawings each illustrating a conventional wet friction material, wherein FIG. 3a is an enlarged front view of an essential part of a wet friction material according to a comparative example, and FIG. 3b is an enlarged front view of an essential part of a wet friction material according to a reference example.

FIG. 4a and FIG. 4b respectively show wet friction materials according to working examples of the embodiment of the present invention, wherein FIG. 4a is an enlarged front view of an essential part of a wet friction material according to a first working example, and FIG. 4b is an enlarged front view of an essential part of a wet friction material according to a second working example.

FIG. 5a and FIG. 5b are explanatory drawings each illustrating a flow of lubricating oil flowing through the wet friction materials, wherein FIG. 5a is an enlarged front view of an essential part of the wet friction material according to the reference example, and FIG. 5b is an enlarged front view of an essential part of the wet friction material according to the second working example.

FIG. 6a, FIG. 6b, FIG. 6c and FIG. 6d are front views illustrating various modified working examples according to the embodiment of the present invention, wherein FIGS. 6a to 6d show four kinds of the modified working examples.

FIG. 7a and FIG. 7b are explanatory drawings for comparing and illustrating the wet friction materials according to the working examples of the embodiment of the present invention, wherein FIG. 7a is an enlarged front view of an essential part of the wet friction material according to one working example (second working example) of the embodiment of the present invention, and FIG. 7b is an enlarged front view of an essential part of the wet friction material according to another working example (third working example) of the embodiment of the present invention.

FIG. 8a, FIG. 8b, FIG. 8c, FIG. 8d and FIG. 8e collectively show a variety of shapes of wet friction materials that were tested on a relative rotating speed and a drag torque characteristic, wherein FIG. 8a shows a shape of the wet friction material according to the comparative example, FIG. 8b shows a shape of the wet friction material according to the reference example, FIG. 8c shows a shape of the wet friction material according to the first example of the embodiment of the present invention, FIG. 8d shows a shape of the wet friction material according to the second working example, and FIG. 8e shows a shape of the wet friction material according to the third working example.

FIG. 9 is a characteristic diagram (graph) showing a relation between a relative rotating speed and a drag torque in the wet friction materials according to the comparative example, the reference example and the working examples of the embodiment of the present invention.

DETAILED DESCRIPTION OF THE INVENTION

Figure 2A:
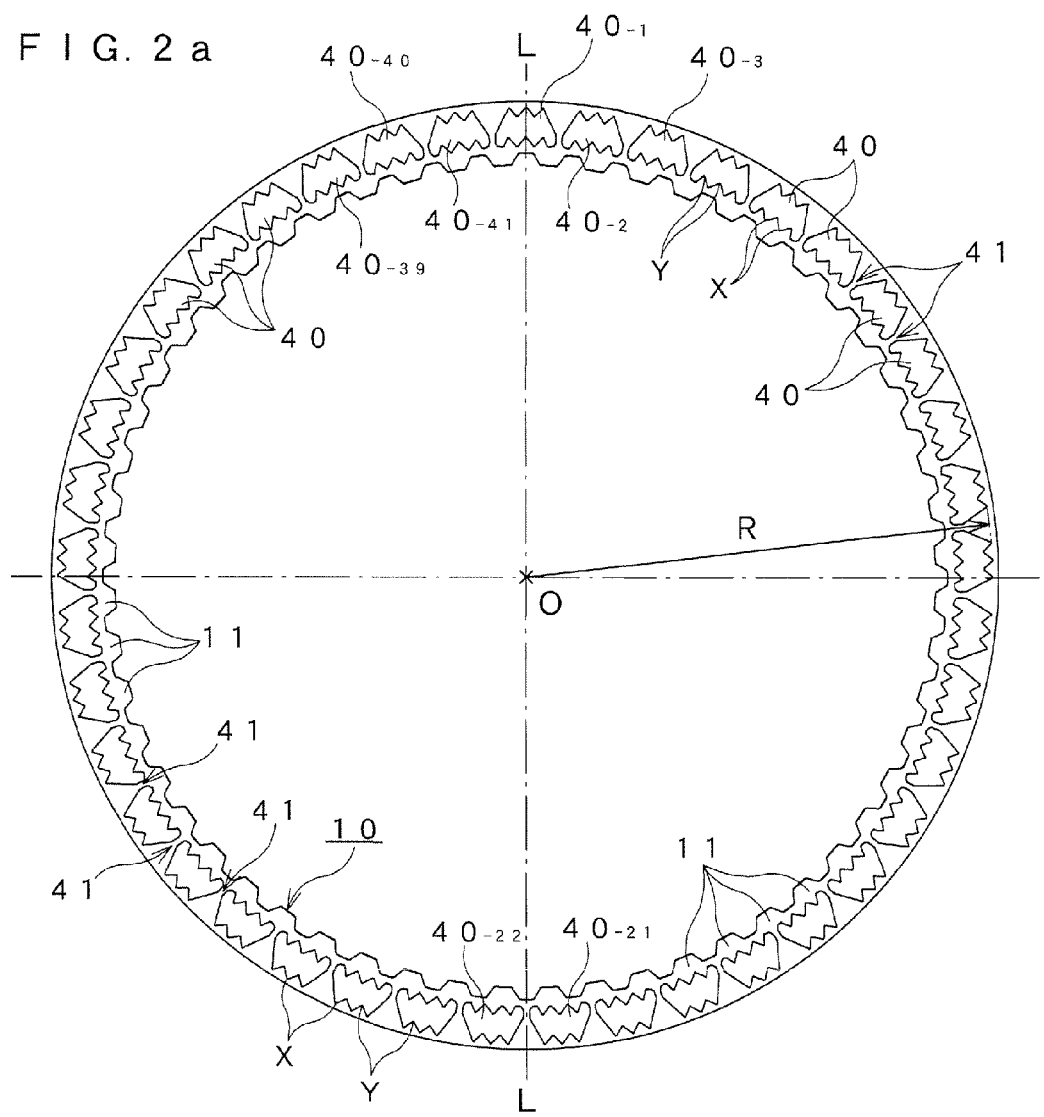

A preferred embodiment of the invention is described hereunder referring to attached drawings. In the embodiment, the same symbol and the same signs shown in the drawings mean the same or equivalent functional parts. Thus, a redundant description thereof may be omitted in the following description.

Embodiment

First, a structure of a wet friction material according to an embodiment of the invention is described referring to FIG. 1.

As shown in FIG. 1, a wet friction material 1 has a core plate 10 and a plurality of segment pieces 40. The segment pieces 40 are stuck or bonded on a specific one surface or on both surfaces of the core plate 10 along a circumferential direction thereof. Moreover, the wet friction material has inter-segment grooves 41 formed by a clearance between adjacent ones of the segment pieces 40. The inter-segment groove 41 extends along an imaginary straight line radially extending from a center of the core plate 10.

To be more specific, the wet friction material 1 is generally composed of the core plate 10 as a metal core, which is formed from a steel plate into a ring shape or an annular shape, and the segment pieces 40 joined on opposite side surfaces of the core plate 10, which is to be used as a paper-type wet friction material. The core plate 10 generally has engagement teeth 11 formed thereon in an integral manner. The engagement teeth 11 are engaged with a spline of a torque transmission element such as a rotary shaft or the like. In the illustrated working example of the present embodiment, the engagement teeth 11 are provided on an inner periphery of the core plate 10.

The segment piece 40 is a component of the wet friction material 1. The segment piece is formed by impregnating a paper-made substrate with a thermosetting resin as a resin binder and by curing and hardening it through a heat forming. The paper-made substrate is made by paper-making from base fibers and a friction modifier (friction conditioner) or a filler. The base fiber may be composed of wood pulp or aramid fibers. The friction conditioner may include cashew dust or the like. The filler may be an extender filler including calcium carbonate or diatomaceous earth. More specifically, as an example, the paper-made substrate may contain, as the base fibers, a fiber substrate composed of 25% by weight of linter pulp and 30% by weight of aramid fibers and, as the filler, 15% by weight of cashew dust and, as the friction conditioner or modifier, 30% by weight of diatomaceous earth. The paper-made substrate is impregnated with a resol-type phenolic resin at a resin content of 30% by weight (a content rate to an entire friction material) and hardened and cured (or thermoset) by heat forming. In practicing the present invention, the segment piece 40 is not limited to the above-described compositions and blending.

On the other hand, counter plates 2 are contacted and pressed to the plurality of the segment pieces 40 of the wet friction material 1 and are frictionally engaged therewith. The counter plate 2 is generally formed from a single metal sheet into a ring shape (annular shape) as in the case of the core plate 10. The counter plate 2 includes a body part 20 having a flat surface that slidably contacts with a wet friction element (such as the segment piece or the like) of the wet friction material 1. The body part 20 has engagement teeth 21 provided therealong in an integral manner. The engagement teeth 21 are engaged with a spline of a torque transmission element or the like. Such counter plate 2 is generally formed of steel (carbon steel). Still, it may be formed of a gray cast iron or the like, too.

The wet friction materials 1 and the counter plates 2 are assembled in an alternate manner to one another, while being immersed in lubricating oil such as ATF, to form a wet friction engagement device 30. A wet frictional engagement device 30 according to a working example shown in FIG. 1 is structured as a wet multi-disc clutch. In the multi-disc clutch, a clutch hub 32 is keyed on an input or output rotary shaft 31. The plurality of segment pieces 40 as the wet friction elements is assembled to the clutch hub 32 by spline coupling so as to be movable in an axial direction. On the other hand, a clutch housing 33 constitutes the input or output rotary shaft. The counter plates 2 are assembled inside the clutch housing 33 by spline coupling so as to be movable in the axial direction in the same manner. Moreover, a hydraulic actuator including an annular piston 34 for pressing the counter plates 2, is formed inside the clutch housing 33. The clutch housing 33 includes an opening end. A pressure receiving member 35 is assembled on the opening end to receive a load of the hydraulic actuator.

Accordingly, in the wet friction engagement device 30, when the piston 34 is operated by a hydraulic pressure from a hydraulic pressure source, the alternately arranged wet friction materials 1 and counter plates 2 are contacted and pressed with each other by the hydraulic pressure between the piston 34 and the pressure receiving member 35. Thus, a torque between the clutch hub 32 and the clutch housing 33 is transmitted by the friction engagement. On the other hand, when the hydraulic pressure is released to deactivate the piston 34, the friction engagement by the hydraulic pressure is released to cut off the transmission of the torque. Thus, the torque can be transmitted or cut off by activating or deactivating an operating means including the piston 34.

In the wet friction engagement device 30, for example, a clutch hub 32 may be used as an inputting side, while the clutch housing 33 being kept stationary. In this case, the wet engagement device 30 can be structured as a wet multi-disc brake. Moreover, as an operating means for bringing the plurality of segment pieces 40 as the wet friction elements and the plurality of counter plates 2 into pressed contact with each other and making them frictionally engaged, a hydraulic system is commonly used as in the present embodiment. Still, other means such as a mechanical system or an electromagnetic system may be used instead. Furthermore, either a positive type or a negative type may be used as in the present embodiment.

The engagement teeth 11 of the core plate 10 are provided on the inner periphery of the core plate 10 so that the teeth 11 are engaged with the spline of the torque transmission element. An outer periphery of the core plate 10 has an annular shape by contrast to the inner periphery having the engagement teeth 11. The core plate 10 has a radius larger by 0.5 to 3 mm than a lining radius R, which is defined by outer peripheral edges of the segment pieces 40 that are stuck to the core plate 10. The lining radius R is defined between a center O of the core plate 10 and the outer peripheral edge of the segment piece 40. In FIG. 2, the lining radius R is defined between the center of the core plate 10 and the outer peripheral edge of the segment pieces $40_{01}$ to $40_{41}$. Here, the segment piece is attached with the reference numeral or symbol of "$40_{01}$ to $40_{41}$" in case it is referred to with focus on the position thereof on the core plate 10, while it is attached with the reference numeral of "40" in case it is referred to without focus on their positions.

Figure 2B:
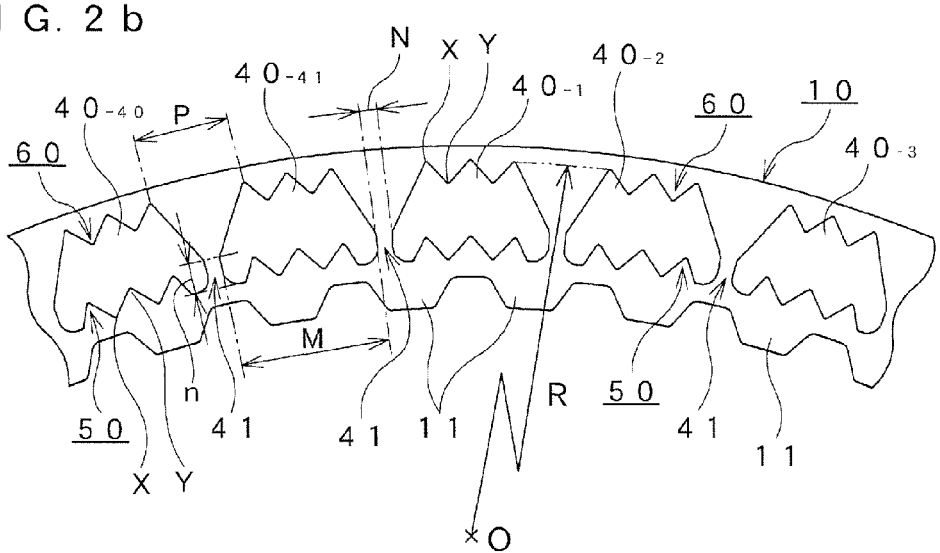

As shown in FIG. 2a, the segment pieces $40_{01}$ to $40_{41}$ are joined on the core plate 10 at regular intervals in the circumferential direction of the core plate 10. Thus, inter-segment grooves 41 are defined between adjacent ones of the segment pieces 40. The inter-segment groove 41 has a first interval N at an inner peripheral side (inner interval or inner opening width N) that is a minimum interval and a second interval P at an outer peripheral side (outer interval or outer opening width P) that is a maximum interval. A maximum length of the segment piece 40 is a length M that is defined as a length of an imaginary straight line connecting opposite ends at the inner circumference thereof. Here, the "inner peripheral side" is an area or section extending inward from a center line of the segment piece 40, while the center line being defined with respect to a radial direction that divides in two the outer circumference and the inner circumference of the segment piece 40, respectively. The "outer peripheral side" is an area or section extending outward from the center line. The minimum interval N and the maximum interval P of the inter-segment groove 41 may be set at a same interval. However, it is desirable to make the interval P at the outer peripheral side wider than the interval N at the inner peripheral side. If these intervals are set as such, ATF supplied from the inner peripheral side is facilitated to run to and communicate from the inner peripheral side to the outer peripheral side of the inter-segment groove 41. Thus, it is easy to give a favorable cooling effect to the wet friction material.

Inner peripheral recesses 50 are formed on the inner peripheral side of the segment piece 40. The inner peripheral recess 50 is formed into a concave shape by providing a dented portion on the inner periphery of the segment piece 40. The concave shape may be varied as shown in FIGS. 2a and 2b or FIGS. 6a to 6d. However, the concave shape is preferably made symmetric with a center line that divides the recess into two in a circumferential direction thereof. In the working example shown in FIG. 2a and FIG. 2b, the inner peripheral recess 50 has a saw-tooth shape or a triangular shape, wherein at least two inner peripheral recesses 50 are formed on the inner periphery of each of the segment pieces 40 in a repeated manner. Here, the inner peripheral recess 50 may change an inclination angle of a side (or both sides) of the triangle if it is desired to change a characteristic or property in a rotation direction of the wet friction material 1. FIG. 6a to FIG. 6d respectively illustrate various modified working examples of the inner peripheral recesses 50. In the segment pieces 40 shown in FIG. 6a to FIG. 6d, outermost inner peripheral recesses 50 at opposite ends of the inner periphery of the segment piece 40 are not symmetrical in shape. The outermost recesses 50 respectively have a specific recessed shape. Still, the plurality of successively provided inner peripheral recesses 50 are symmetrical (as a whole) with the center line with respect to the circumferential direction of the segment piece 40.

As described above, the inner peripheral recess 50 is the recess provided on the inner periphery of the segment piece 40. At least two inner peripheral recesses 50 are provided on the inner periphery of the segment piece 40. Preferably, the inner peripheral recess 50 has a symmetrical shape in itself. Here, the "symmetrical shape" means not only that a concave shape of a single inner peripheral recess 50 is symmetrical with a center line that divides the inner peripheral recess 50 into two in a circumferential direction thereof, but also that the inner peripheral recesses 40 are symmetrical as a whole with the center line with respect to the circumferential direction of the segment piece 40.

From another viewpoint, the inner peripheral recess 50 of the segment piece 40 may be viewed as a concavo-convex shape formed on an inner peripheral surface of the inner peripheral side of the segment piece 40. The concavo-convex shape may be a saw-tooth shape composed of a peak X that is convex to the inside and a trough Y that is concave to the inside, namely a triangular shape. More specifically, the concavo-convex shape may be viewed as repeated isosceles triangles in case it is symmetrical with the center line in the circumferential direction.

In the present embodiment, at least two outer peripheral recesses 60 may be formed on an outer periphery of the segment piece 40. The outer peripheral recess 60 is formed on an outer peripheral side of the segment piece 40, and a concave shape is formed on the outer periphery of the segment piece 40. The concave shape may be varied as in the case of the inner peripheral recess 50, too. The outer peripheral recess 60 is preferably symmetrical with the center line in the circumferential direction thereof.

The outer peripheral recess 60 may be viewed as a concavo-convex shape formed on an outer peripheral surface of the outer peripheral side of the segment piece 40 as in the case of the inner peripheral recess 50. The concavo-convex shape may be a saw-tooth shape composed of a peak X that is convex to the outside and a trough Y that is concave to the outside. Of course, an inclination angle of the right and left directions or right and left sides may be changed if it is desired to change a characteristic in right and left rotation directions of the wet friction material 1.

The segment pieces 40 used in several working examples of the present invention have inter-segment grooves 41 formed between adjacent ones of the segment pieces 40. The inter-segment groove 41 has an interval N at an inner circumference that is a minimum interval and an interval P at an outer circumference that is a maximum interval as in a comparative example and a reference example shown in FIG. 3a and FIG. 3b. A lateral dimension at the inner periphery of the segment piece 40 is a length M. A lateral dimension at the outer periphery of the segment piece 40 is a length L that is a minimum length of the segment piece 40. The lateral dimension of the segment pieces 40 is hereafter described such that a maximum dimension is the length M and the minimum dimension is the length L, regardless of whether it is the inner peripheral dimension or the outer peripheral dimension.

Figure 4A:
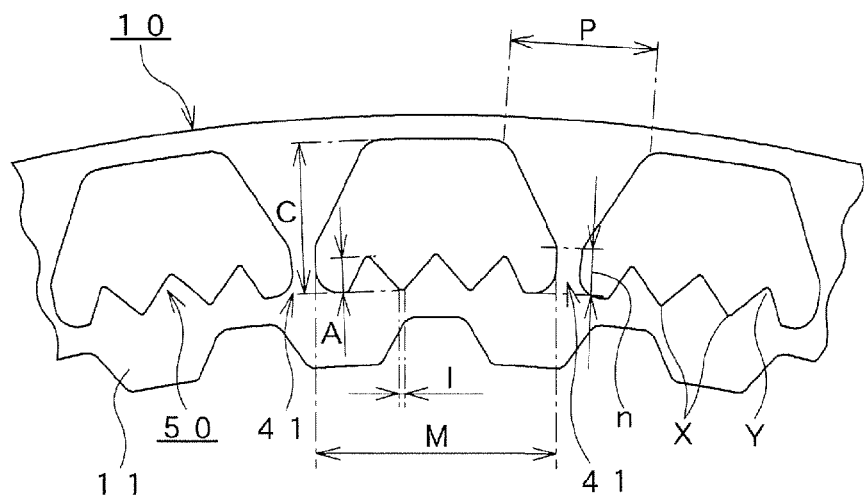

FIG. 4a shows a wet friction material 1 according to a first working example of the present invention. In the wet friction material 1, a plurality of segment pieces 40 are joined on or stuck to a specific one surface or on both surfaces of a core plate 10. The segment piece 40 is formed as an individual member by punching a friction material substrate or the like. At this time, the length M of the plurality of segment pieces 40 may be set at a desired size that is suitable for characteristics or property to be achieved. Normally, the size and the number of the segment pieces 40 is set at such a value as about 12 pieces to 46 pieces of the segment pieces 40 can be coupled on the surface of the core plate 10. A conventional technique can be applied to the number and the size of the segment pieces 40 of the present embodiment. In the wet friction material 1 according to the first working example, the segment piece 40 has an outer peripheral side of a linear shape, while having three inner peripheral recesses 50 formed only on an inner periphery thereof.

Figure 4B:
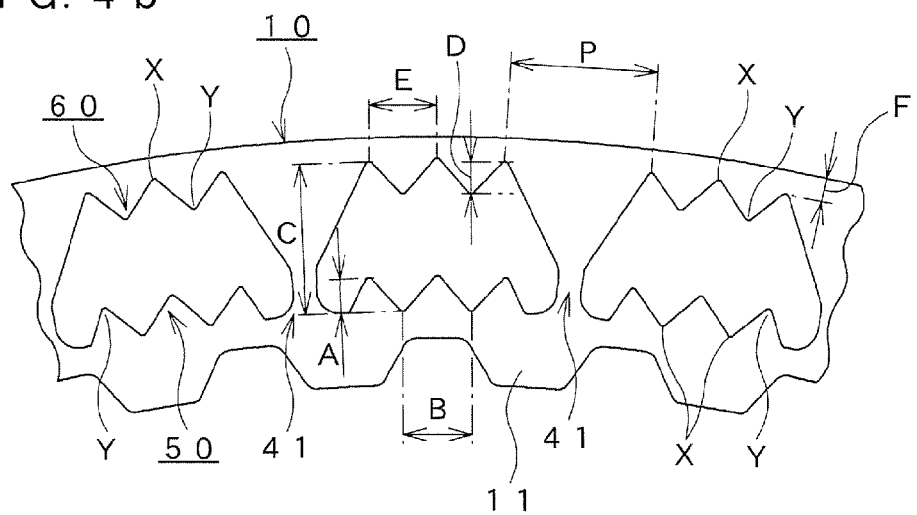

A wet friction material 1 according to a second working example shown in FIG. 4b has segment pieces 40. The segment piece 40 is made by providing outer peripheral recesses 60, which are composed of two dents, on an outer periphery of the segment piece 40 of the first working example. A maximum length of the segment piece 40 is a length M, and a minimum length of the segment piece 40 is a length L.

The inner peripheral recesses 50 of the wet friction materials 1 according to the first and second working examples have a triangular shape. Specifically, each of the inner peripheral recesses 50 is symmetrical in shape and has an isosceles triangle shape. Therefore, continuous inner peripheral recesses 50 are formed on the inner periphery of the segment piece 40. Thus, an end face (which may be hereafter referred to as "inner peripheral end face") remaining on the inner periphery of the segment piece 40 is reduced by the area where the inner peripheral recesses 40 are provided. When the wet friction material 1 with the segment pieces 40 rotates, ATF relatively flows along the inner peripheries of the segment pieces 40. Still, in the present invention, the segment pieces 40 have a reduced amount (or reduced total length) of the inner peripheral end face that is to be in contact with ATF flowing in the inner circumferential direction of the segment piece 40.

Figure 5A:
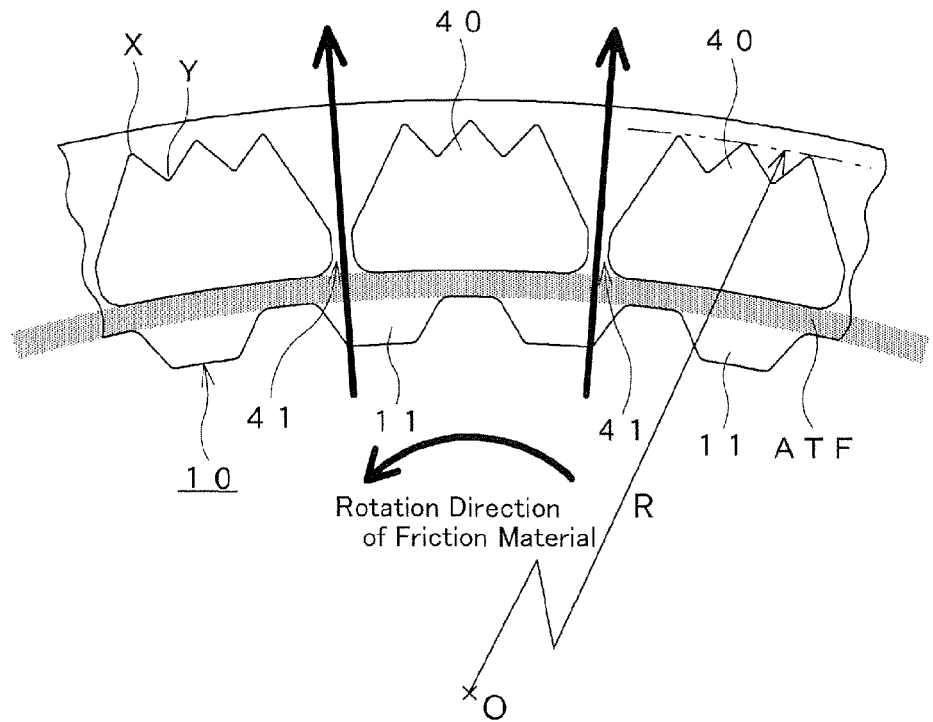
Figure 5B:
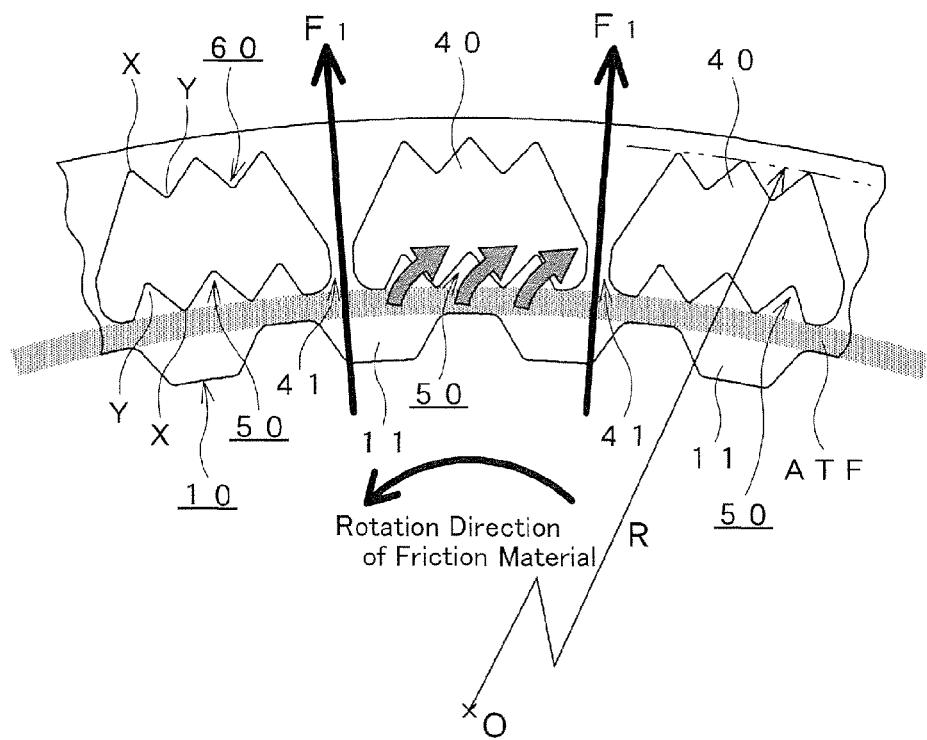

Accordingly, a ratio at which ATF comes in contact with the inner peripheral end face of the segment piece 40 decreases, thereby causing a reduction in the contact resistance. Moreover, a shearing toque generated by ATF and the inner peripheral end face of the segment piece 40 can be reduced. As described above, if the inner peripheral recess 50 is provided, it is possible to efficiently reduce the drag torque generated in the inner circumferential direction of the segment piece 40. In addition, the triangle-shaped inner peripheral recess 50 has a width narrower from a base thereof to an apex thereof. An oil film is easily formed by overflow of ATF to a top surface of a friction material as shown in FIG. 5b, if the inner peripheral recess 50 is formed to have an opening width narrower from an inner periphery to an outer periphery of the segment piece 40 as described above. Thus, the wet friction material 1 is separated from a counter plate 2 through the oil film generated by the overflowing effect of ATF. Therefore, the drag torque generated between the wet friction material 1 and the counter plate 2 can be reduced. More specifically, the inner peripheral recess 50 can efficiently reduce the drag torque generated by ATF flowing through the inner periphery of the segment piece 40 as well as the drag torque generated between a friction surface of the segment piece 40 and the counter plate.

An effect to reduce the drag torque is obtained by combination of the effect to reduce the contact resistance and the shearing torque at the inner peripheral end face of the segment piece 40 and the effect to make ATF overflow. However, the effects depend on a rotating speed of the wet friction material 1. The effect to make ATF overflow is high when the rotating speed is low. On the other hand, the effect to reduce the contact resistance and the shearing torque at the inner peripheral end face is high when the rotating speed is high. This is because, as the rotating speed is higher, it is easy for ATF to relatively generate a flow in the inner circumferential direction as a main flow, thereby causing a reduction in a flow amount of ATF into the inner peripheral recess 50.

Accordingly, by the presence and the shape of the inner peripheral recesses 50 of the present embodiment, it is possible to control the contact resistance and the shearing torque between ATF and the inner peripheral end face of the segment piece 40 and control overflow of ATF from the inner peripheral recess 50 to the top surface of the segment piece 40. Thus, the drag torque can be efficiently reduced.

Here, the inner peripheral recess 50 is formed by providing the recess on the inner periphery of the segment piece 40. Still, a recessed amount A of the inner peripheral recess 50 is set within a range of ⅒ to ⅓ of a radial width C of the segment piece 40. Within this range, it is possible to efficiently reduce the drag torque by the inner peripheral recess 50 without reducing a transmission torque more than necessary. In addition, if at least two inner peripheral recesses 50 are formed on the inner periphery of the segment piece 40, an inner peripheral end portion is formed between the inner peripheral recesses 50 on the inner periphery of the segment piece 40. Still, a circumferential width l of the inner peripheral end portion is regulated within a range of 0.3 mm to 2 mm. With the range regulated as such, it is possible to prevent the inner peripheral end portion from being peeled off from the core plate 10. Thereby, the wet friction material can reduce the contact resistance with ATF, while assuring durability thereof.

More specifically, the inner peripheral end portion is easily peeled off if the width l is smaller than 0.3 mm. On the other hand, it is hard to obtain a sufficient reduction in the contact resistance if the width l is over 2 mm.

Here, a leading end or edge of the inner peripheral end portion according to the present embodiment has an arc shape or a linear shape. Accordingly, the circumferential width l of the leading end of the inner peripheral end portion is a diameter of a chamfered part formed by chamfering a leading end or a width of a straight line of the leading end. It is preferable to chamfer opposite ends of the straight line in a linear manner or a circular manner if the leading end of the inner peripheral end portion has the linear shape.

Figure 6A:
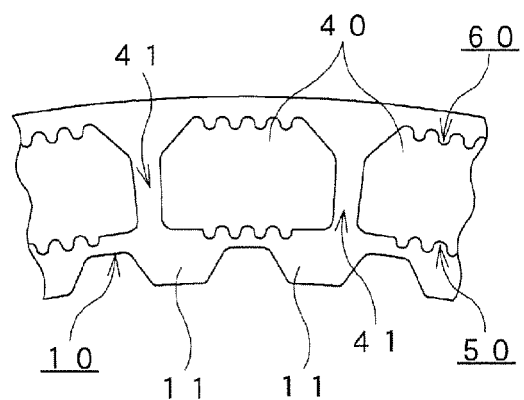
Figure 6B:
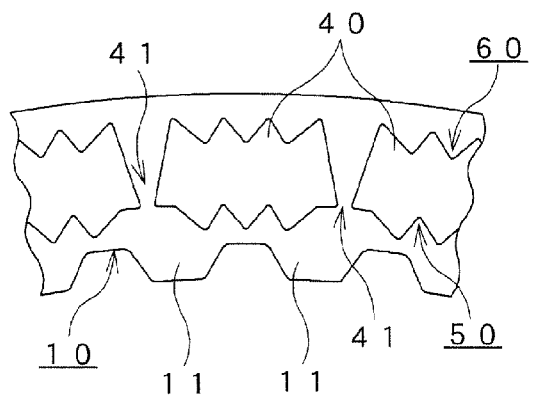
Figure 6C:
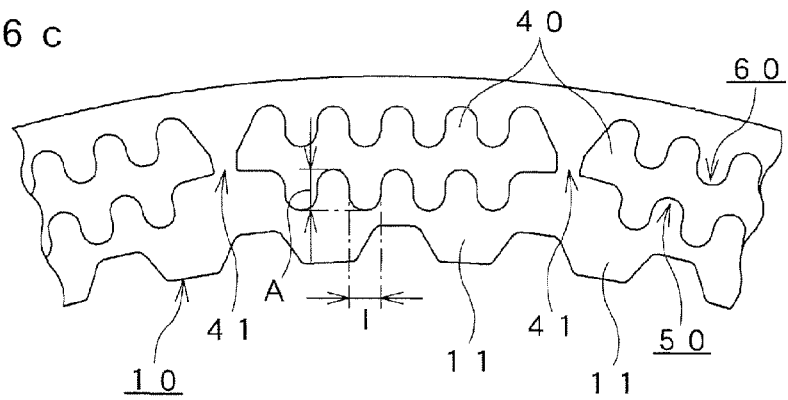
Figure 6D:
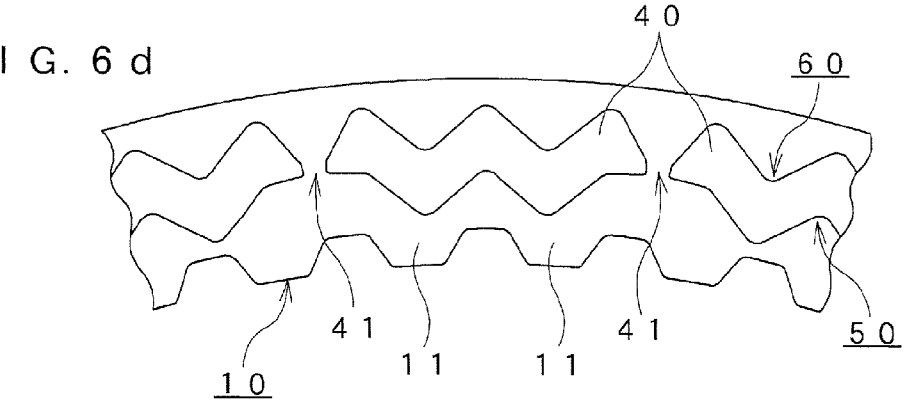

As described above, the leading end (having the circumferential width l) of the inner peripheral end portion is preferably chamfered. The inner peripheral end portion is easily peeled off if it is not chamfered. In particular, the inner peripheral end portion is preferably formed so that opposite ends (along the width thereof) of the leading end has a rounded shape. An effect to prevent peeling-off is improved if the opposite ends of the leading end of the inner peripheral end portion are formed respectively into the rounded shape. More preferably, the leading end of the inner peripheral end portion is formed into a half moon shape having a rounded shape that is provided over the width thereof as shown in FIG. 6c. The effect to prevent peeling-off is further improved if the leading end of the inner peripheral end portion is formed into such shape.

In the present embodiment, the circumferential width l of the leading end of the inner peripheral end portion is normally obtained by drawing an asymptotic line by a straight line. More specifically, the width l represents a distance between connecting points at which both of the leading ends of the inner peripheral end portion are respectively connected to the (adjacent two of) inner peripheral recesses 50. If the inner peripheral end portion is chamfered, the width l is a distance between connecting points at which the chamfered part is connected to the (adjacent two of) inner peripheral recesses 50.

In the above description, the inner peripheral recess 50 of the segment piece 40 was described. Still, the same effect as that of the inner peripheral recess 50 can be obtained even when the outer peripheral recess 60 is provided on the outer periphery of the segment piece 40. More specifically, as shown in FIG. 4b, in the second working example, the outer peripheral recess 60 is provided on the outer periphery of the segment piece 40 in addition to the inner peripheral recess 50. At this time, the inner peripheral recess 50 in the second working example has the same effect as that of the inner peripheral recess 50 in the first working example. Moreover, the outer peripheral recess 60 of the second example can reduce the drag torque by reducing the contact resistance and the shearing torque with a decrease in the ratio at which the outer peripheral end face of the segment piece 40 comes in contact with ATF flowing in the outer circumferential direction of the segment piece 40. At the same time, the outer peripheral recess 60 reduces another drag torque by separating the wet friction material 1 from the counter plate 2 by the effect to make ATF overflow from the outer peripheral recess 60 to the friction surface of the segment piece 40 in the same manner as the inner peripheral recess 50. Therefore, the second working example has a great effect to reduce the drag torque as compared with the first working example.

Figure 8A:
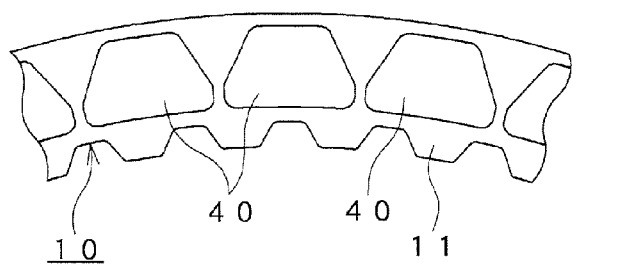
Figure 8B:
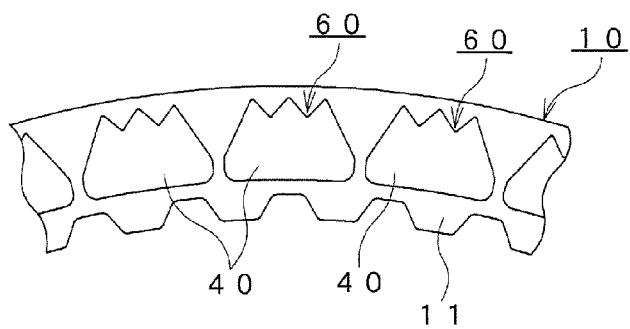
Figure 8C:
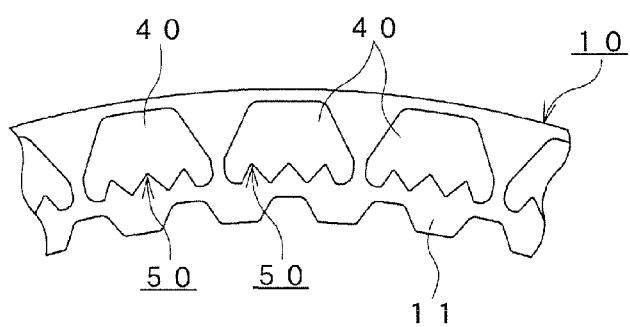
Figure 8D:
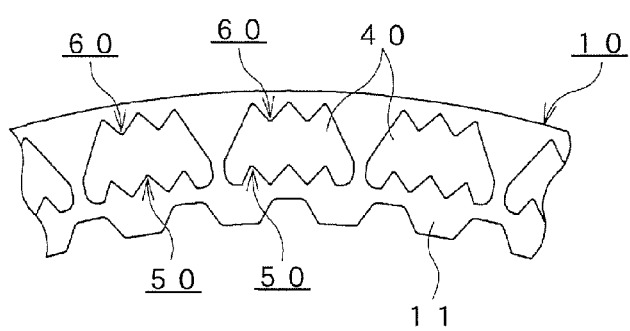
Figure 8E:
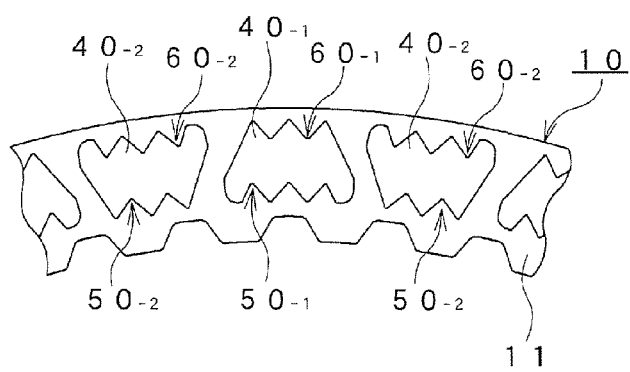

As described above, the second working example of the wet friction material can more efficiently reduce the drag torque as compared with the first working example. Still, since the wet friction material of the second working example has the outer peripheral recesses 60 provided on the outer periphery of the segment piece 40, it has a reduction in an area of the outer peripheral side of the segment piece 40 facing the counter plate 2. Therefore, the second working example (shown in FIG. 8*d*) has a reduced capacity for a torque generated with the counter plate 2 and may be hard to assure a desired torque transmission as compared to the first working example (shown in FIG. 8*c*). In view of such points, a third working example is configured as shown in FIG. 8*e* and as described below. That is, the wet friction material according to the third working example has first segment pieces $40_{-1}$ and second segment pieces $40_{-2}$ as the segment pieces. The first segment pieces $40_{-1}$ and the second segment pieces $40_{-2}$ are disposed alternately. The first segment piece $40_{-1}$ is arranged on the core plate 10 such that an outer peripheral width (first width) is made shorter than an inner peripheral width (second width) thereof. The first segment piece $40_{-1}$ has at least two inner peripheral recesses formed on an inner periphery thereof and at least two outer peripheral recesses formed on an outer periphery thereof. The second segment piece $40_{-2}$ is arranged on the core plate 10 such that an outer peripheral width (third width) is made larger than an inner peripheral width (fourth width) in an opposite manner to the first segment piece $40_{-1}$. The second segment piece $40_{-2}$ has at least two inner peripheral recesses formed on an inner periphery thereof and at least two outer peripheral recesses formed on an outer periphery thereof. More specifically, in the third working example, the segment pieces 40 according to the second working example are used as the first segment pieces $40_{-1}$. The second segment pieces $40_{-2}$ is obtained by disposing the first segment pieces $40_{-1}$ on the core plate 10 in a reverse direction by 180° so that an inner periphery thereof and an outer periphery thereof comes in opposite positions. That is, it can be said that, in the third working example, the segment pieces 40 of the second working example are arranged such that every other segment piece thereof is reversely disposed.

As described above, the wet friction material of the third working example uses not only the first segment pieces $40_{-1}$ each having the outer peripheral width smaller than the inner peripheral width but also the second segment pieces $40_{-2}$ each having the outer peripheral width larger than the inner peripheral width. Thus, a total area of an outer peripheral sides of the segment pieces 40 that face the counter plate 2 in the whole wet friction material 1 can be set larger as compared with a case in which only the first segment pieces $40_{-1}$ are provided. Accordingly, the third working example of the wet friction material has a large transmission torque as compared with the second working example. While the third working example comprises the first segment pieces $40_{-1}$ and the second segment pieces $40_{-2}$ disposed alternately one by one, the present invention is not limited thereto. For example, at least two second segment pieces $40_{-2}$ may be arranged adjacent to one first segment piece $40_{-1}$ and this arrangement may be repeated. Moreover, all the segment pieces may be composed of only the second segment pieces $40_{-2}$. In these modified working examples or variations, the number of the disposed second segment pieces $40_{-2}$ increases. Thereby, these modified working examples of the wet friction materials are able to assure a transmission torque larger than that of the third working example. Depending on the number of the segment pieces 40, the repeated number of the first segment pieces $40_{-1}$ and the repeated number of the second segment pieces $40_{-2}$ may not be always the same. The repeated number thereof may be partially different from each other. Even in this case, since the second segment pieces $40_{-2}$ are provided, it is possible to assure a transmission torque larger than that of the second working example that has only the first segment pieces $40_{-1}$.

More specifically, it is possible to easily adjust the drag torque and the transmission torque by changing the ratio between the first segment pieces $40_{-1}$ and the second segment pieces $40_{-2}$ that are disposed on the whole wet friction material 1. The ratio of the first and the second segment pieces disposed on the core plate can be varied by changing the number of the first segment pieces $40_{-1}$ and the number of the second segment pieces $40_{-2}$ that are disposed alternately on the core plate. At this time, the first and the second segment pieces $40_{-1}$ and $40_{-2}$ may be arranged alternately one by one as in the case of the third working example. Or successive first segment piece $40_{-1}$ and/or successive second segment piece $40_{-2}$ may be arranged alternately. In this case, the number of the first segment pieces $40_{-1}$ and the number of the second segment pieces $40_{-2}$ that are disposed alternately may be set as desired with respect to the first segment pieces $40_{-1}$ and the second segment pieces $40_{-2}$, respectively, so far as they are disposed alternately by the set numbers. It is not necessary that the number of the first segment pieces and the second segment pieces that are disposed alternately are always the same. The first segment pieces and the second segment pieces may be disposed at different numbers from each other.

Next, a test was conducted on a drag torque with respect to a relative rotating speed in the embodiment of the present invention. The test results are described hereafter.

Test pieces (wet friction materials) according to the first to the third working examples of the present embodiment were prepared. Moreover, test pieces (wet friction materials) according to the comparative example and the reference example were prepared. In the wet friction material according to the first working example, each of the segment pieces 40 stuck on the core plate 10 has the inner peripheral recesses 50 that are formed only on the inner periphery thereof and that are oriented toward the center of the core plate 10, as shown in FIG. 8*c*. In the wet friction material according to the second working example, each of the segment pieces 40 stuck on the core plate 10 is the one that forms the outer peripheral recesses 60 on the outer periphery of the segment piece 40 of the first working example, as shown in FIG. 8*d*. In the wet friction material according to the third working example, the first segment pieces $40_{-1}$ and the second segment pieces $40_{-2}$ are disposed alternately on the core plate 10, as shown in FIG. 8*e*. Moreover, the comparative example was prepared for comparison. In the wet friction material according to the comparative example, each of the segment pieces 40 stuck on the core plate 10 has no inner peripheral recess 50 and no outer peripheral recess 60 formed thereon, as shown in FIG.

8a. Furthermore, the reference working example was prepared to examine or confirm an effect of the inner peripheral recess 50. In the wet friction material according to the reference example, each of the segment pieces 40 stuck on the core plate 10 has only the outer peripheral recess 60 thereon, as shown in FIG. 8b. Therefore, the outer peripheral recess 60 of the reference example was set to have the same shape as that of the outer peripheral recess 60 of the second working example.

Here, as shown in FIG. 4a, in the first working example, the recessed amount A of the inner peripheral recess 50 is ¼ of the radial width of the segment piece 40. The circumferential width l of the inner peripheral end portion is 0.6 mm. In the second working example, the recessed amount A of the inner peripheral recess 50 and the circumferential width l of the inner peripheral end portion were set at the same values as those of the first working example. In addition, the outer peripheral recess 60 was formed to have the same shape as that of the inner peripheral recess 50. In the third working example, the segment pieces 40 of the second working example were used to form the first segment pieces $40_{-1}$ and the second segment pieces $40_{-2}$ as described above.

The test was conducted under the conditions as follows. A rotating speed was set at 500 to 3000 rpm. ATF was used as a lubricating oil. An oil temperature was at 40° C. An oil amount of the lubricating oil was 1000 ml/min (without shaft center lubrication). As for a size of the wet friction material, an outer diameter Φ1 was 152.8, and an inner diameter Φ2 was 144. The number of discs of the wet friction material was four. A pack clearance was 0.20 mm per plate. Under the above conditions, a drag torque was measured when the relative rotating speed between the wet friction material 1 and the counter plate 2 was varied from 500 rpm to 3000 rpm. The results are shown in FIG. 9.

As seen from the results of the test shown in FIG. 9, it was found that the wet friction materials according to the first to the third working examples of the invention had a large reduction effect in the drag torque in a whole range of the rotating speeds by forming the inner peripheral recesses 50, as compared with the comparative example having no inner peripheral recess 50 and no outer peripheral recess 60 formed thereon. In addition, the reference example had a large reduction effect in the drag torque in the whole range of the rotating speeds as compared with the comparative example, too, since the reference example had the outer peripheral recess 60 formed thereon. Here, it was confirmed that the first working example was superior to the reference example in the low rotating speed of up to about 1600 rpm and that it was preferable to form the inner peripheral recess 50 on the inner periphery rather than on an outer periphery of the segment piece 40 in order to reduce the drag torque during rotation in the low-speed range. Moreover, the second and the third working examples had a large reduction effect in the drag torque in the whole range of the rotating speeds as compared with the comparative example and the reference example, since the second and the third working examples had the inner peripheral recess 50 and the outer peripheral recess 60 formed thereon. Comparing the second working example and the third working example, they had the same result for the effect to reduce the drag torque.

Based on the results, it is concluded as follows.

When the wet friction material 1 rotates, ATF on the inner peripheries of the segment pieces 40 tend to relatively flow along the inner peripheries of the segment pieces 40. At this time, the segment pieces 40 of the first to the third working examples have the inner peripheral recesses 50 formed on the inner peripheral side thereof. Therefore, ATF flowing along the inner peripheries of the segment pieces 40 have a reduced contact area with the inner peripheral end faces of the segment pieces 40 as compared with those having no inner peripheral recesses 50 formed on the inner peripheral sides of the segment pieces as in the reference example shown in FIG. 5a. Accordingly, the contact resistance and the shearing torque generated between ATF flowing along the inner periphery and the inner peripheral end face of the segment piece 40 are reduced. Consequently, the drag torque is reduced. In the second working example, as shown in FIG. 5b, ATF overflows to the friction surfaces (top surfaces) of the segment pieces 40. Though not shown in the drawings, this is the same in the third working example. By such overflowing effect of ATF, the wet friction material 1 is separated from the counter plate 2. Therefore, the drag torque between the wet friction material 1 and the counter plate 2 is reduced. More specifically, the second and the third working examples have the inner peripheral recess 50 provided thereon, thereby making it possible to reduce the drag torque (first kind of drag torque) generated by the contact resistance or the shearing toque with ATF flowing along the inner periphery, while making it possible to reduce the drag torque (second kind of drag torque) generated between the wet friction material 1 and the counter plate 2 more than that of the comparative example. Here, the wet friction material 1 of the first working example has no outer peripheral recesses 60 formed thereon contrary to the second working example. Thus, in the first example of the wet friction material 1, the drag torque is rather affected during rotation in a high-speed range of more than 1600 rpm, as compared with the reference example having the outer peripheral recesses 60 formed thereon. This phenomenon is assumed as follows.

It is though that the first working example of the wet friction material 1 has the same effect by the inner peripheral recesses 50 as that of the inner peripheral recesses 50 of the second example, too. However, a large amount of ATF is accumulated at the outer periphery of the wet friction material 1 by a centrifugal force in the high-speed range. Therefore, it is assumed that the reference example has a large reduction in the contact resistance and the shearing torque with ATF flowing along the outer peripheries of the segment pieces 40, as compared with the first working example of the wet friction material 1 that has no outer peripheral recesses 60 provided on the outer peripheral side of the segment piece 40, since the reference example has the outer peripheral recesses 60 provided thereon. Moreover, in the reference example, it is guessed that separation of the wet friction material 1 from the counter plate 2 is facilitated by the overflowing effect of ATF from the outer peripheral recesses 60, thereby efficiently reducing the drag torque. From the comparison as stated above between the reference example and the first working example, it is found that, though the effect of the outer peripheral recess 60 includes the same effect as the effect of the inner peripheral recess 50, the effect of the inner peripheral recess 50 and the effect of the outer peripheral recess 60 appear in different manners from each other depending on the relative rotating speed. More specifically, it is guessed that the effect of the inner peripheral recess 50 is high when the relative rotating speed is low and ATF mainly flows through the inner peripheral area. On the other hand, it is guessed that the effect of the outer peripheral recess 60 is high when the relative rotating speed is high and ATF mainly flows through the outer peripheral area. Thereby, in either case, the drag torque is to be reduced.

Here, the test results show that the third working example of the wet friction material 1 has almost the same effect to reduce the drag torque as that of the second working example.

Still, with respect to the segment pieces 40 disposed on the wet friction material 1, the second working example has only the first segment pieces $40_{-1}$ each of which has the outer peripheral width smaller than the inner peripheral width and which is also provided in the third working example. By contrast, the third working example further has the second segment pieces $40_{-2}$ each having the outer peripheral width larger than the inner peripheral width, in addition to the first segment pieces $40_{-1}$ each having the outer peripheral width smaller than the inner peripheral width. Accordingly, the total area of the outer peripheral sides of all of the segment pieces 40 in the wet friction material 1 is larger in the third working example compared to the second working example. With an increase in this area, the third working example of the wet friction material 1 enables a larger transmission torque as compared with the second working example.

Though not shown as the embodiment of the present invention, only the second segment pieces $40_{-2}$ may be arranged on the core plate 10 if a desired cooling efficiency is obtained. A larger transmission torque can be achieved if only the second segment pieces $40_{-2}$ are arranged on the core plate 10 as described above.

Figure 7A:
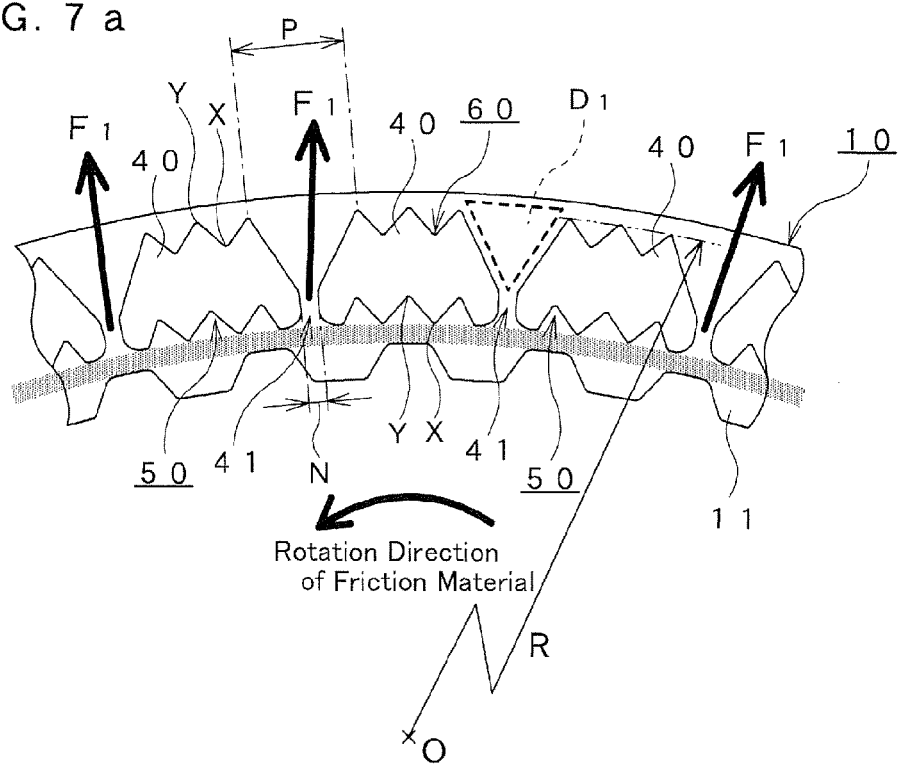
Figure 7B:
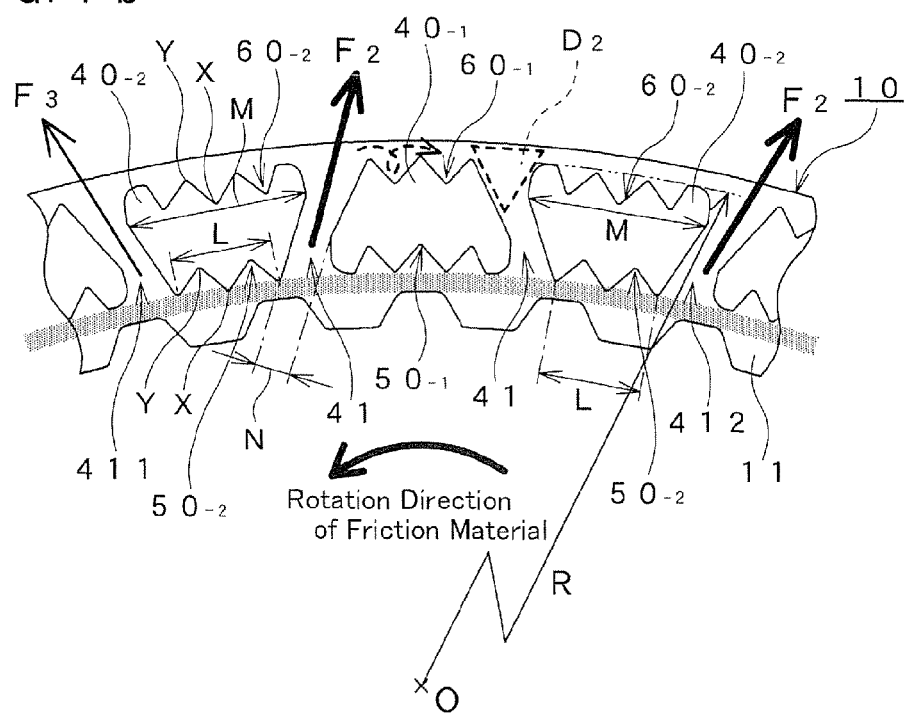
Figure 10:
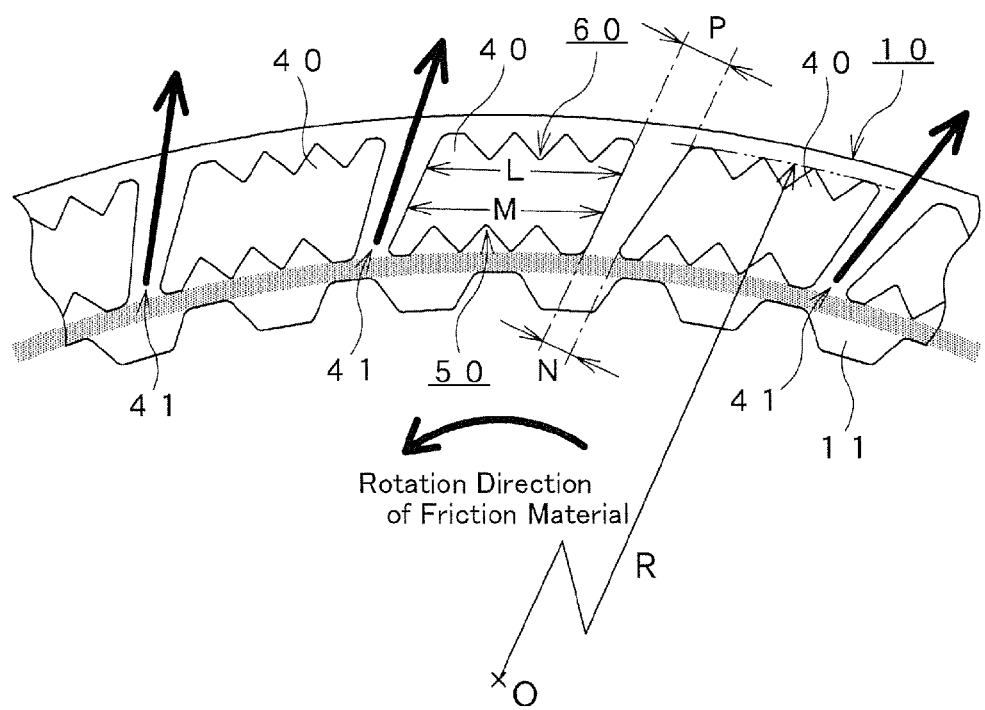
FIG. 10 shows a wet friction material according to a modified working example of the embodiment of the present invention.

The cooling efficiency is affected by the flow amount of ATF flowing through inter-segment grooves 41. The flow amount of ATF is regulated by or varies due to the shape of the inter-segment groove 41. The wet friction materials 1 according to the first and the second working examples have the inter-segment grooves 41 formed thereon such that they extend radially from the rotation center of the wet friction material 1 and such that the outer peripheral width of the groove 41 becomes larger than the inner peripheral width thereof. If the inter-segment groove 41 is thus configured, ATF supplied from the inner peripheral side easily flows from the inner peripheral side to the outer peripheral side of the inter-segment groove 41 (F1 direction in FIG. 7a). In the first and the second working examples, the width of the inter-segment grooves 41 is changed from the inner peripheral side to the outer peripheral side thereof to a large degree. Still, if a desired cooling efficiency is obtained, the width of the inter-segment grooves 41 of the first and the second working examples may be changed to a smaller degree, while making the outer peripheral width larger than the inner peripheral width thereof, as illustrated in a modified example of the second working example shown in FIG. 10. Even these configurations enable the friction surface between the outer peripheral side of the segment piece 40 and the counter plate 2 to be set large, too. In the first working example, the second working example and the modified example of the second working example, the inter-segment grooves 41 are oriented in a fixed direction. In contrast, in the wet friction material 1 according to the third working example, the changing amount of the width of the inter-segment groove 41 is smaller as compared with the first and second working examples. Moreover, in terms of the direction of the inter-segment groove 41, there are provided two types of inter-segment grooves by the first segment piece $40_{-1}$ and the second segment pieces $40_{-2}$: first inter-segment grooves 411 and second inter-segment grooves 412, as shown in FIG. 7b. The first inter-segment groove 411 is formed to extend from the rotation center in a forward direction in the rotation direction of the wet friction material 1 (i.e. in the first direction). The second inter-segment groove 412 is formed to extend in a direction opposite to the first direction or from the rotation center against the rotation direction of the wet friction material 1 (i.e. in the second direction). ATF supplied to the inner peripheral side of the segment piece 40 moves toward the outer periphery in the radial direction of the wet friction material 1 through the inter-segment groove 41. At this time, the flow amount of ATF flowing in F3 direction (in FIG. 7b) through the inter-segment groove 411, which is formed in the forward direction in the rotation direction, is smaller than the flow amount of ATF flowing in F2 direction through the inter-segment groove 412, which is formed in the direction against the rotation direction. This is because ATF flowing in F3 direction is pushed toward the second segment piece $40_{-2}$ by the rotation of the wet friction material 1, while moving through the inter-segment groove 411, thereby causing increase in then amount of ATF overflowing to the top surface of the segment piece $40_{-2}$. Therefore, in the third working example, the inter-segment groove 412 formed in F2 direction is mainly used for ATF flowing form the inner peripheral side to the outer peripheral side. The inter-segment groove 411 formed in F3 direction is mainly used for supplying ATF to the top surface of the second segment piece $40_{-2}$. Both of them have different functions from each other.

As described above, in the present embodiment of the invention, if at least two inner peripheral recesses 50 are formed on each of the inner peripheries of the plurality of the segment pieces 40, it decreases the contact resistance generated between the inner peripheries of the segment pieces 40 and ATF flowing along the inner peripheries of the segment pieces, while restraining a resultant shearing torque. Thus, the drag torque can be reduced. Moreover, ATF flowing into the inner peripheral recess 50 overflows to the top surface of the segment piece to form an oil film. Thereby, the drag torque generated with the counter plate can be reduced. At this time, the recessed amount of the inner peripheral recess is made within a range of $\frac{1}{10}$ to $\frac{1}{3}$ of the radial width of the plurality of the segment pieces. Thereby, the drag torque can be reduced while a desired torque transmission being achieved.

Here, the inner peripheral recess 50 is particularly effective for reducing a drag torque generated in a low rotating speed of about 1600 rpm or less. This phenomenon is explained as below. That is, since a centrifugal force applied to ATF is not so large during rotation in the low-speed range, a drag torque is easily generated by ATF flowing through the inner peripheral side of the segment piece 40. However, the drag torque is hardly generated if the inner peripheral recesses 50 are provided as in the present invention. Here, at least two inner peripheral recesses 50 are provided on each of the inner peripheries of the plurality of the segment pieces 40 in the present invention. It means a configuration in which recesses are provided for certain as two or more inner peripheral recesses 50 on each of the segment pieces 40. In this sense, in terms of the peak X or the trough Y, it is enough that the number of the troughs Y be two or more.

The shape of the inner peripheral recess 50 is a shape, for example, such as a triangle, such that an opening width is narrower from the inner periphery toward the outer periphery of the segment piece 40. If the inner peripheral recess 50 has such a shape as the opening width is narrower toward the outside, ATF receives a centrifugal force and easily overflows to the top surface of the segment piece 40. The wet friction material 1 is easily separated from the counter plate 2 by ATF thus overflowed. Therefore, it is possible to reduce the drag torque generated between the wet friction material 1 and the counter plate 2. In addition, since a large opening is to be provided on the inner periphery of the segment piece 40, there is a reduction in the contact area with ATF flowing through the inner periphery, thereby causing a decrease in the contact resistance. Moreover, the shearing torque generated by interaction of the inner periphery of the segment piece 40 and ATF can be reduced, too. Therefore, it is possible to reduce the drag torque generated by the contact resistance and the shearing torque.

Here, if the inner peripheral recess 50 has such a shape as has the opening width narrower toward the outer periphery, there is a reduction in the width of the inner peripheral end portion of the segment piece 40, so that the inner peripheral end portion is easily peeled off from the core plate 10. Therefore, in the present embodiment of the invention, the circumferential width l of the inner peripheral end portion is regulated within the predetermined range of 0.3 to 2 mm. The inner peripheral recess 50 is configured such that the circumferential width of the inner peripheral end portion is regulated within the predetermined range. Therefore, it is possible to prevent the inner peripheral end portion from being peeled off from the core plate 10, while assuring a desired torque transmission. Moreover, durability thereof is assured.

In addition, in the wet friction material 1 according to the present embodiment of the invention, the outer peripheral recess 60 is formed thereon in addition to the inner peripheral recess 50. The outer peripheral recess 60 gives the same effect as that of the inner peripheral recess 50. Here, the inner peripheral recess 50 reduces the drag torque generated on the inner periphery of the segment piece 40 as well as the drag torque generated between the segment pieces and the counter plate. On the other hand, the outer peripheral recess 60 reduces the drag torque generated on the outer periphery of the segment piece 40 as well as the drag torque generated between the segment pieced and the counter plate. At this time, if a large centrifugal force acts on ATF, ATF moves to the outer periphery of the segment piece 40. Thereby, the drag torque is easily generated on the outer periphery. The outer peripheral recess 60 has effects to prevent such drag torque during rotation in a high-speed range at which the large centrifugal force is applied to ATF. It is appropriately chosen depending on a specification required in the wet friction material 1 whether to provide the outer peripheral recess 60 on the segment piece 40 or not. However, if the outer peripheral recess 60 is formed in addition to the inner peripheral recess 50, it is possible to reduce the drag torque in the whole range of rotating speed from the low-speed range to the high-speed range.

As described above, the wet friction materials 1 according to the first to the third examples comprise the plurality of segment pieces 40 joined on or stuck to the specific one surface or on both surfaces of the annular core plate 10, and the inter-segment grooves 41 formed between adjacent ones of the plurality of segment pieces 40, wherein the plurality of segment pieces 40 has at least two inner peripheral recesses 50 composed of the recess formed on the inner periphery thereof and at least two outer peripheral recesses 60 composed of the recess formed on the outer periphery thereof.

Accordingly, the contact resistance generated by ATF flowing along the inner periphery of the segment piece 40 decreases and the resulting shearing torque is restrained. Thereby, the drag torque can be reduced. Moreover, since there is a regulation in the recessed amount of at least two inner peripheral recesses 50 composed of the recess and in the recessed amount of at least two outer peripheral recesses 50 composed of the recess, it is possible to prevent the transmission torque from being reduced more than necessary. Thereby, the drag torque can be reduced.

Here, as in the third working example, if the wet friction material 1 comprises the first segment pieces 40$_{-1}$ and the second segment pieces 40$_{-2}$ that have the inner and outer peripheral widths different from each other and that are disposed alternately, it has little reduction in the transmission torque, thereby easily obtaining a desired transmission torque as compared with a case in which the segment pieces 40 have a same shape.

The invention claimed is:

1. A wet friction material comprising:
    an annular core plate,
    a plurality of segment pieces bonded in an annular arrangement on a specific one surface or on both surfaces of the core plate, and
    inter-segment grooves formed between adjacent ones of the segment pieces,
    wherein each of the segment pieces has at least two inner peripheral recesses formed on an inner periphery thereof,
    wherein the segment pieces include width-decreasing segment pieces each of which has a circumferential width gradually decreasing from an inner peripheral side to an outer peripheral side thereof with increasing radius so that the inter-segment groove formed between adjacent ones of the width-decreasing segment pieces has a circumferential width gradually increasing from the inner peripheral side to the outer peripheral side,
    wherein the inner peripheral recess has a recessed amount within a range of $\frac{1}{10}$ to $\frac{1}{3}$ of a radial width of the segment piece, and
    wherein the segment pieces include width-increasing segment pieces each of which has a circumferential width gradually increasing from an inner peripheral side to an outer peripheral side thereof with increasing radius.

2. A wet friction material according to claim 1, in which the segment piece has an inner peripheral end portion remaining at the inner periphery of the segment piece by formation of the inner peripheral recess, the inner peripheral end portion having a circumferential width within a range of 0.3 to 2 mm.

3. A wet friction material according to claim 2, in which each of the segment pieces has at least two outer peripheral recesses formed on an outer periphery thereof, the outer peripheral recess having a recessed amount within a range of $\frac{1}{10}$ to $\frac{1}{3}$ of a radial width of the segment piece.

4. A wet friction material according to claim 1, in which each of the segment pieces has at least two outer peripheral recesses formed on an outer periphery thereof, the outer peripheral recess having a recessed amount within a range of $\frac{1}{10}$ to $\frac{1}{3}$ of a radial width of the segment piece.

5. A wet friction material according to claim 1,
    wherein the width-increasing segment piece is disposed between adjacent ones of the width-decreasing segment pieces.

6. A wet friction material comprising:
    an annular core plate,
    a plurality of segment pieces bonded in an annular arrangement on a specific one surface or on both surfaces of the annular core plate, and
    inter-segment grooves formed between adjacent ones of the plurality of segment pieces,
    wherein the segment pieces include first segment pieces and second segment pieces,
    wherein the first segment piece has a first width at an outer periphery and a second width at an inner periphery so that the first width is smaller than the second width, and the first segment piece has at least two inner peripheral recesses formed at the inner periphery and at least two outer peripheral recesses formed at the outer periphery,
    wherein the second segment piece has a third width at an outer periphery and a fourth width at an inner periphery so that the third width is greater than the fourth width, and the second segment piece has at least two inner peripheral recesses formed at the inner periphery and at least two outer peripheral recesses formed at the outer periphery, and wherein the first segment piece and the second segment piece are alternately disposed to define the annular arrangement.

7. A wet friction material according to claim 6, in which the segment piece has an inner peripheral end portion remaining at the inner periphery of the segment piece by formation of the inner peripheral recess, the inner peripheral end portion having a circumferential width within a range of 0.3 to 2 mm.

8. A wet friction material according to claim 7, in which each of the segment pieces has at least two outer peripheral recesses formed on an outer periphery thereof, the outer peripheral recess having a recessed amount within a range of $1/10$ to $1/3$ of a radial width of the segment piece.

9. A wet friction material according to claim 6, in which each of the segment pieces has at least two outer peripheral recesses formed on an outer periphery thereof, the outer peripheral recess having a recessed amount within a range of $1/10$ to $1/3$ of a radial width of the segment piece.

10. A wet friction material comprising:
an annular core plate,
a plurality of segment pieces bonded in an annular arrangement on a specific one surface or on both surfaces of the annular core plate, and
inter-segment grooves formed between adjacent ones of the plurality of segment pieces, wherein the segment pieces include first segment pieces and second segment pieces, wherein the first segment piece has a first width at an outer periphery and a second width at an inner periphery so that the first width is smaller than the second width, and the first segment piece has at least two inner peripheral recesses formed at the inner periphery and at least two outer peripheral recesses formed at the outer periphery, wherein the second segment piece has a third width at an outer periphery and a fourth width at an inner periphery so that the third width is greater than the fourth width, and the second segment piece has at least two inner peripheral recesses formed at the inner periphery and at least two outer peripheral recesses formed at the outer periphery, and wherein one or more of the first segment pieces and one or more of the second segment pieces are disposed in a successive manner to define the annular arrangement.

11. A wet friction material according to claim 10, in which a first set number of the first segment pieces and a second set number of the second segment pieces are disposed alternately, while the first set number and the second set number are different numbers from each other.

* * * * *